United States Patent
Auriol et al.

(12)

(10) Patent No.: US 6,260,734 B1
(45) Date of Patent: Jul. 17, 2001

(54) DEVICE FOR DISTRIBUTING PARTS SINGLY AND A DEVICE FOR STORING THESE PARTS

(75) Inventors: Jean-Marc Auriol; Philippe Bornes, both of Balma; Sylvain Guerin, Seclin, all of (FR)

(73) Assignees: Ste Ateliers de la Haute-Garonne-Ets Auriolo Et Cie, Balma; Dassault Aviation, Vaucresson, both of (FR)

( * ) Notice: Subject to any disclaimer, the term of this patent is extended or adjusted under 35 U.S.C. 154(b) by 387 days.

(21) Appl. No.: 08/765,169

(22) PCT Filed: Jun. 12, 1995

(86) PCT No.: PCT/FR95/00764

§ 371 Date: Dec. 13, 1996

§ 102(e) Date: Dec. 13, 1996

(87) PCT Pub. No.: WO95/34391

PCT Pub. Date: Dec. 21, 1995

(30) Foreign Application Priority Data

Jun. 13, 1994 (FR) .................................... 94 07288

(51) Int. Cl.$^7$ .............................. B21J 15/32; B23P 19/00
(52) U.S. Cl. .......................... 221/278; 221/298; 221/299; 221/301; 406/108; 406/196
(58) Field of Search .................................. 406/83, 86, 20, 406/108, 148, 149, 150, 191, 192, 196; 221/298, 299, 301, 278; 138/97, 137; 193/25 B, 25 S

(56) References Cited

U.S. PATENT DOCUMENTS

| 907,692 | * | 12/1908 | Hervey | 406/196 |
|---|---|---|---|---|
| 2,390,318 | * | 12/1945 | Offutt | 221/278 |
| 2,755,143 | * | 7/1956 | Cunningham | 406/196 |
| 2,916,125 | * | 12/1959 | Wallberg | 221/298 |
| 3,082,909 | * | 3/1963 | Hawkes | 221/278 |
| 3,984,000 | * | 10/1976 | Miller | 221/307 |
| 4,332,516 | * | 6/1982 | Nakahara et al. | 193/25 S |
| 5,163,787 | * | 11/1992 | Bjorklund et al. | 406/196 |
| 5,335,810 | * | 8/1994 | Holloway | 221/298 |

FOREIGN PATENT DOCUMENTS

| 2916231 | * | 10/1980 | (DE) | 406/192 |
|---|---|---|---|---|
| 0 567 240 A1 | | 10/1993 | (EP) . | |
| 0 618 022 A1 | | 10/1994 | (EP) . | |
| 2-18225 | * | 1/1990 | (JP) | 221/299 |
| WO 91/18695 | | 12/1991 | (WO) . | |

* cited by examiner

Primary Examiner—Eileen D. Lillis
Assistant Examiner—Thuy V. Tran
(74) Attorney, Agent, or Firm—Young & Thompson

(57) ABSTRACT

A device for dispensing single components, in particular rivets of different shapes and sizes, wherein the rivets are conveyed to a riveting station one by one in a given direction along a path; the rivets are moved along and within an elastic sheath (11) by a pressure source (P); the device also includes a device for storing the components and includes a holder (24) for feeding the components one by one to the elastic sheath (11); the device provides for the uniform and steady feeding of rivets to riveting machines such as are used in the aircraft industry.

23 Claims, 4 Drawing Sheets

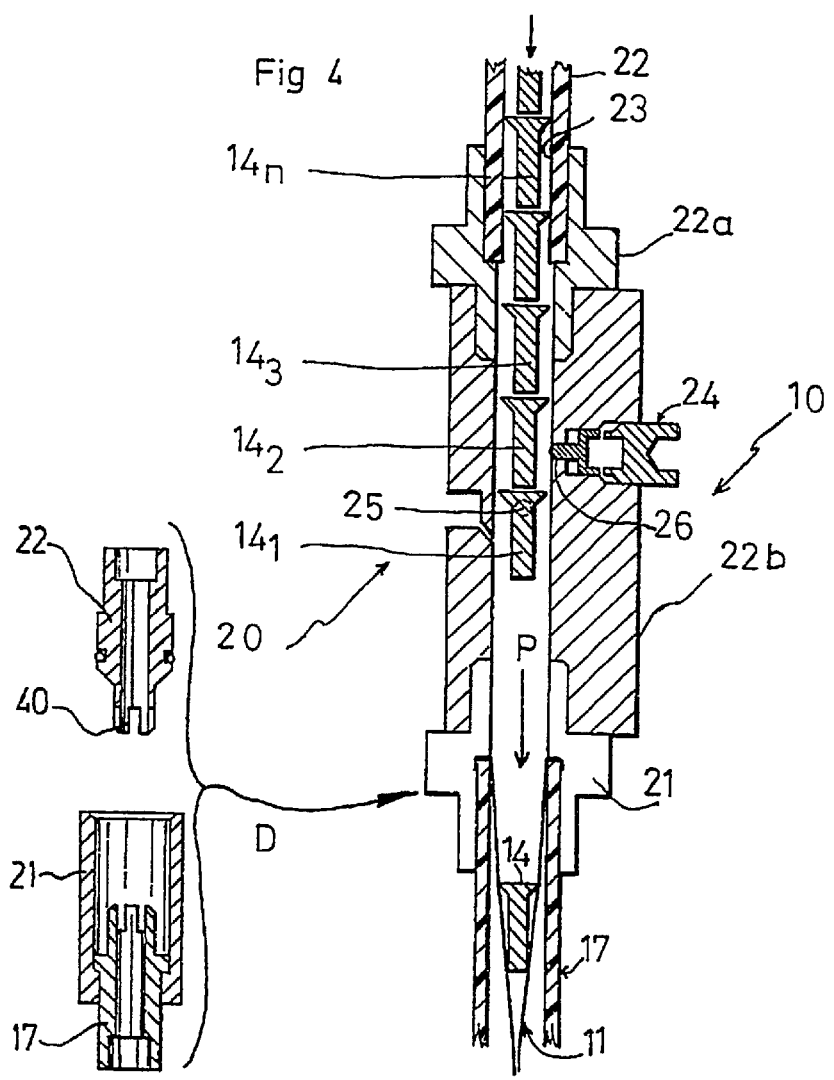

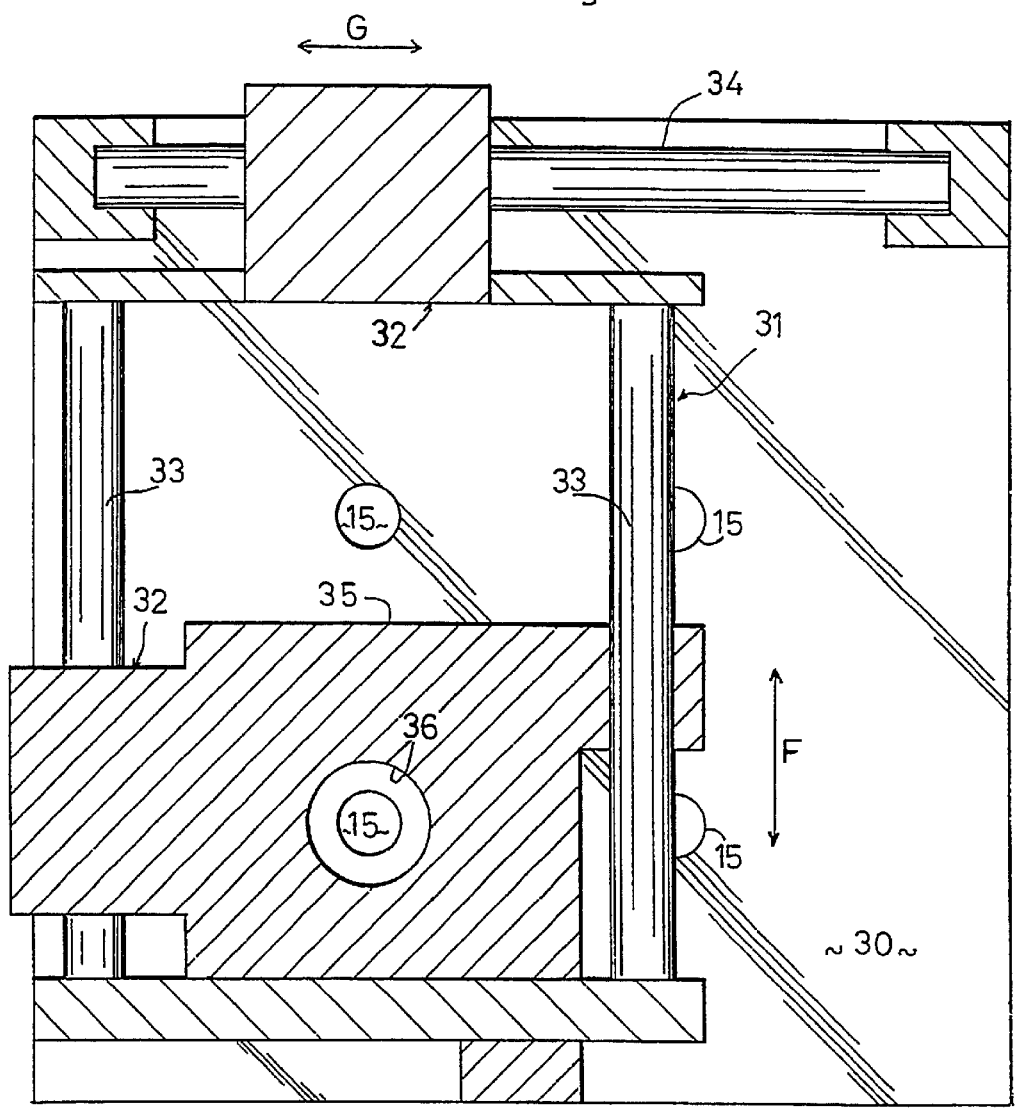

DEVICE FOR DISTRIBUTING PARTS SINGLY AND A DEVICE FOR STORING THESE PARTS

The present invention concerns a device for distributing parts singly and a device for storing these parts.

More particularly, the parts in question are rivets intended to feed a riveting machine in a continuous and uniform manner.

BACKGROUND AND OBJECTS OF THE INVENTION

It is well known that in order to ensure uniform rivetting, which is imperative (particularly in the field of aeronautics) it is necessary to feed a riveting machine in the most uniform manner possible. Each rivet must arrive at the riveting station in the right direction and one by one. Now, a riveting machine may be fed by several types of rivets with different lengths, diameters and shapes of the head. It is thus necessary to establish separate storage devices each containing a particular type of rivet. It is then necessary to use a selection device for a particular type of rivet and means for distributing this rivet singly to a riveting machine.

At the present time, however, no device exists for distributing rivets singly capable of delivering rivets of different sizes and shapes, always in the same position, while guiding them correctly along their path.

The aim of the present invention is to overcome all these disadvantages and more particularly to create a device for distributing parts singly enabling parts of different sizes and shapes to be delivered, always in the same position. Such a device must be simple, low in cost, and easy to use and manufacture.

DESCRIPTION OF THE INVENTION

For this purpose, the present invention concerns a device for distributing parts singly, more particularly rivets, wherein it comprises:
- a deformable elastic means having a substantially tubular shape in the passive state comprising a central bore with a narrow section and inlet and outlet openings, said elastic means being capable, in the active state, of expanding radially so as to receive and guide a part in its central bore, and
- a source of pressure capable of subjecting the internal bore of the elastic means to an excess pressure and to bring about a radial expansion of this so as to move, one by one, each part placed at the inlet orifice towards the outlet orifice of the elastic means.

Thus, the invention consists of using, as a distribution device, a deformable elastic means, for example a sheath made of extensible material (of the thin balloon type) for distributing one by one parts conveyed to the inlet of this distribution device, and leading them to the outlet (namely to a riveting machine) by the action of a source of pressure (for example compressed air).

Advantageously, in order to prevent the elastic means bursting or deforming in an irreversible manner, this elastic means is placed inside a tube having a certain radial rigidity so as to limit the radial expansion of the elastic means. This tube may on the other hand have a certain flexibility in the longitudinal direction.

Advantageously, the device for distributing parts singly according to the present invention comprises a means for storing parts. This means of storage is capable of containing a plurality of parts and of delivering them one by one, to order, to the elastic means.

The means of storage according to the invention consists of an assembly of tubular elements, in which the parts to be stored are stacked one behind the other. A retaining means enables the first of these parts to be freed, to order, while holding all of the other parts.

When several storage means are associated, each containing different parts, the distribution device according to the invention comprises, in addition, a means of selection capable of receiving a part derived from any means of storage whatsoever with a view to leading it to the inlet orifice of the elastic means.

The present invention concerns a storage device capable of being used in a distribution device according to one of the preceding claims, wherein the said device comprises:
- a tubular element, a connector and a retaining element, each having an internal bore capable of housing and guiding a plurality of parts placed one behind the other,
- a source of pressure, capable of exerting a pressure inside the central bore, on a first part of the said plurality and,
- retaining means provided in the retaining element, capable of retaining the first part and the following part, to liberate the first part to order and to put the following part in readiness by causing it to pass to the first position and thus to deliver each part of the plurality singly.

Such a storage device is more particularly provided with retaining means capable of delivering the first part stored and of retaining all the others. As soon as the first part is delivered, the second takes its place, in order to be ready for the next delivery.

Advantageously, the retaining means consists of two rams operating in opposition and acting to retain the first and second parts stored, respectively. Thus, when the first part stored is retained, the second is not and vice-versa.

Advantageously, these two rams are arranged orthogonally in relation to each other.

BRIEF DESCRIPTION OF THE DRAWINGS

Other objectives, aims and features of the present invention will become more apparent from the following description, which is given by way of information, with reference to the accompanying drawings in which:

FIG. 4 is a diagrammatic view in longitudinal section showing a means of storage associated with the elastic means of FIG. 2, FIG. 4a is an exploded detail view of an alternative embodiment to that shown in FIG. 4;

FIGS. 5 to 7 are diagrammatic views in longitudinal section of the means of storage showing the operation of the retaining means.

DESCRIPTION OF PREFERRED EMBODIMENTS

Figure 1:
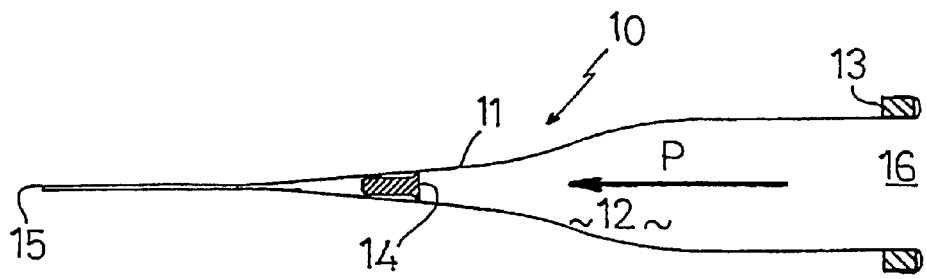
FIG. 1 is a diagrammatic view in longitudinal section of an elastic means according to the invention.

According to the embodiment shown in FIG. 1, the distribution device 10 according to the invention comprises:

a deformable elastic means 11, in the form of a flat extensible sheath and, a source of pressure (not shown), here compressed air, the action of which (arrow P) is applied to the inside of the elastic means 11 and causes the central bore 12 of this to expand.

The elastic sheath 11 is folded back and attached to a ring 13 firmly fixed to a frame (not shown).

A part 14, here a rivet, moves inside the sheath 11 from an inlet orifice 16 towards an outlet orifice 15 (arrow P) under the action of compressed air.

It will be noted that, under the action of the pressure exerted, the sheath 11 expands radially and thus enables the rivet 14, also subjected to the source of pressure (exerted on its head), to move forward in the sheath. The rivet 14 thus forms, as it were, a stopper closing off the sheath and preventing air under pressure from escaping directly through the outlet orifice 15 of this sheath.

On account of this, the rivet 14 is pushed progressively and uniformly towards the outlet orifice 15. It will be easily understood that by virtue of the radial expansion of the sheath, the latter may receive rivets of different sizes and shapes. Moreover, since the sheath grips the rivet and only expands after the head of this rivet has passed, the rivets are guided and held all along their path inside the sheath.

Figure 2:
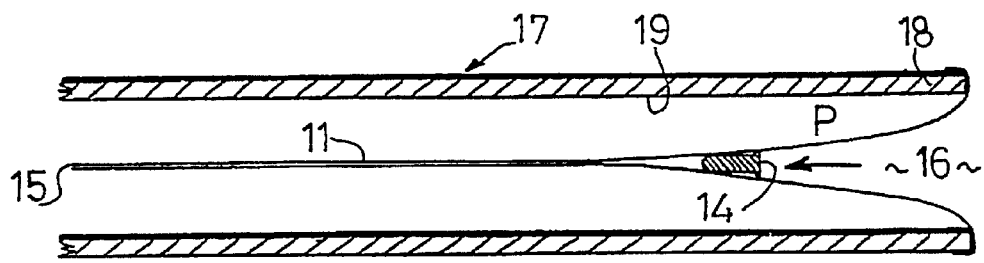
FIG. 2 is a diagrammatic view in longitudinal section of the elastic means of FIG. 1 placed inside a tubular element.
Figure 3:
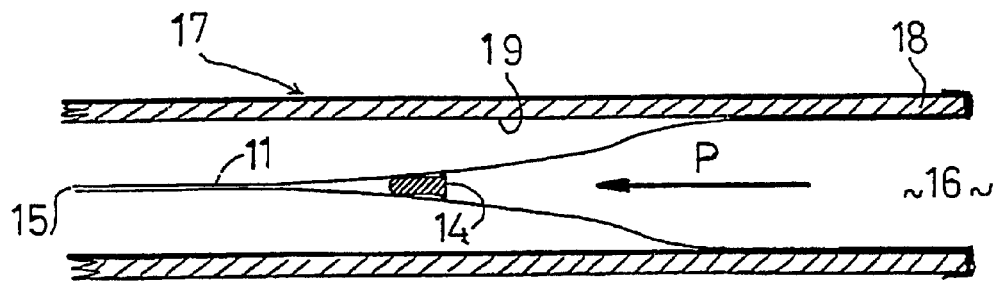
FIG. 3 is a similar view to FIG. 2 showing the movement of a part inside the elastic means.

As a variant, in order to prevent the sheath from bursting or deforming in an irreversible manner, it is placed inside a tubular element 17 (FIGS. 2 and 3) having a longitudinal bore 19. This tubular element has a certain radial rigidity and a longitudinal flexibility.

In this case, the inlet orifice 16 of the sheath is folded back and fixed (for example by gluing) to the end 18 of the tubular element itself. The principle whereby the rivet 14 moves forward inside the elastic sheath 11 remains the same. However, as will be better seen in FIG. 3, radial expansion of the sheath 11 is limited by the presence of the tubular element 17.

As shown in FIG. 4, such a distribution device may comprise, in addition, a storage device 20. This storage device is connected to the elastic means by a means of connection 21 of a known type.

The storage device comprises a hollow tubular element 22 having a central bore 23, connected to a retaining element 22b by means of a conventional connector 22a. All of these elements 22, 22a and 22b have the same central bore 23.

The rivets $14_1$ to $14_n$ (n being a whole number greater than 1) are stacked one behind the other in this central bore 23.

A retaining means 24, consisting of two pistons 25 and 26, mounted orthogonally in relation to each other, is placed in the retaining element 22b. These pistons are able to extend alternately inside the central bore 23. In full extension (FIGS. 5 to 7), the pistons contact the stem of one of the rivets $14_1$ or $14_2$, and thus lock it in position in relation to the element 22b.

The action of the pistons 25, 26 is controlled by a 5/2 valve. Thus (FIG. 5), the piston 25 (further downstream in the element 22b) holds the part $14_1$ by its head and locks it in position. All the other parts $14_2$ to $14_n$ are on account of this also held in position while the piston 26 (further upstream in the element 22b) is retracted.

A certain pressure exists inside the central bore 23. This pressure is capable of acting on the first part $14_1$ in such a way that this part would have the tendency to leave the element 22b if it were not held by the ram 25.

When the part $14_1$ is conveyed to the elastic means, the downstream ram 25 retracts and frees the part $14_1$ while the upstream ram 26 is deployed and comes into contact with the stem of the rivet $14_2$. The rivet $14_2$ and those following are thus held in position (FIG. 6). As soon as the rivet $14_1$ leaves the element 22b (FIG. 7), the pair of rams are once again brought into play to deploy the downstream ram 25 and to retract the upstream ram 26. There is then a return to the same position as in FIG. 5, but with the rivet $14_2$ locked in the first position.

By virtue of such a retaining mechanism, it is thus possible to control the departure, one by one, of rivets stored in the storage device 20.

It will be noted that the rams 25 and 26 retract inside the retaining element 22b under the action of compressed air and move forward in the bore 23 due to two springs (not shown). As a result of this, if there is any blockage in the compressed air circuit, the springs lock the rams in the forward position (inside the bore) which locks all the parts 14 and prevents damage to the riveting machine. This makes for increased safety when this storage device is employed.

Figure 8:
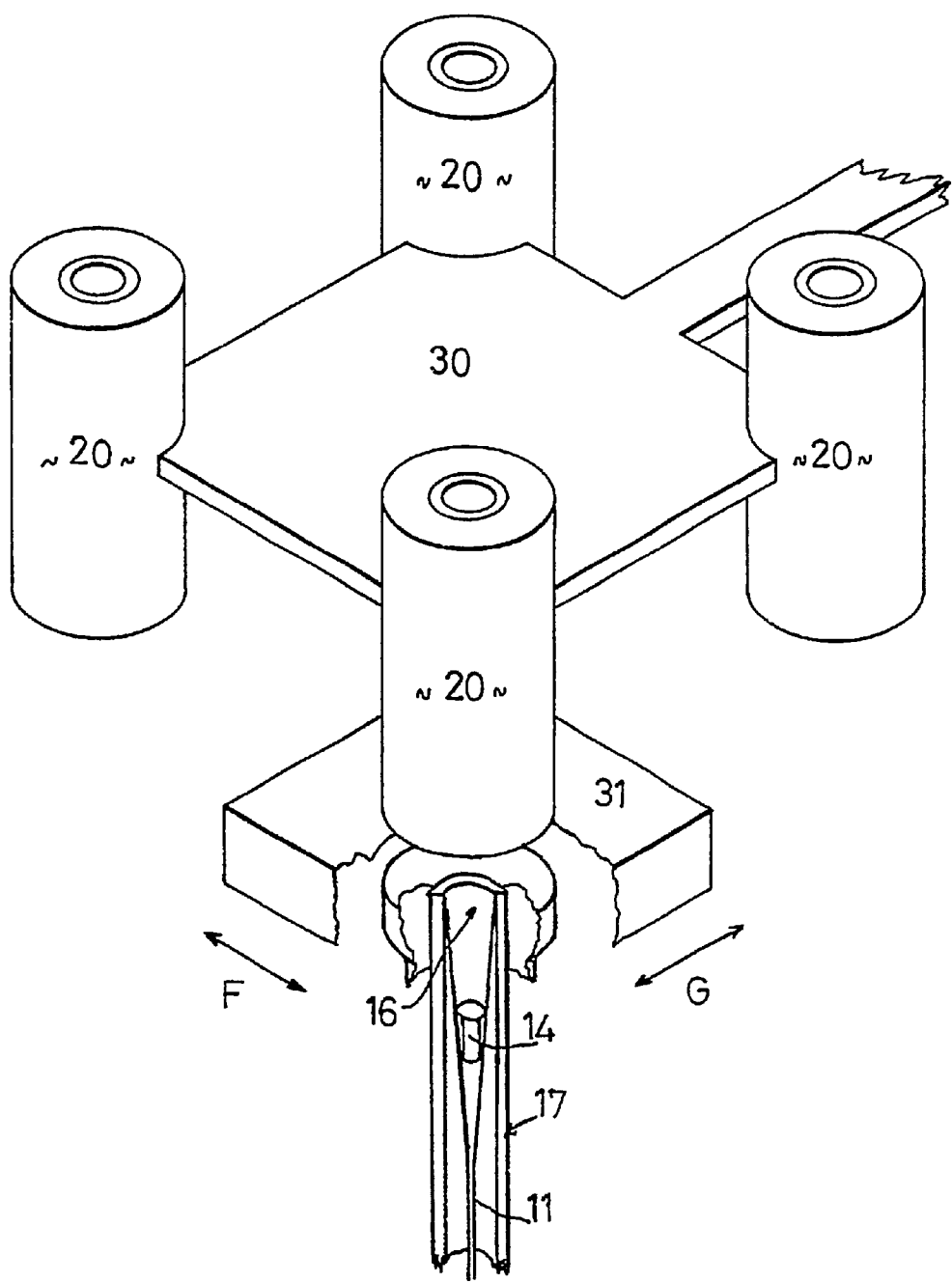
FIG. 8 is a perspective view, partially cut away, showing a device for distributing parts according to the invention, comprising an elastic means, a means of selection and a plurality of means of storage and, FIG. 9 is a diagrammatic view in transverse section of the means of selection shown in FIG. 8.

When several storage devices 20 are linked together (FIG. 8), for example by a frame 30, the distribution device as claimed in the invention comprises:

the plurality of storage devices 20, a means of selection 31 and, the elastic means 11 in its tubular element 17.

The means of selection 31 is a single plate which can be moved in two orthogonal directions (arrows F and G) so as to enable the opening 16 of the elastic means 11 carried by the selection means 31 to be brought into coincidence with the outlet orifice (not visible in FIG. 8) of any one of the storage devices 20.

In the example shown, the means of selection 31 is associated with four storage devices, but obviously the number of storage devices may be greater or smaller.

As is clearly visible in FIG. 9, the means of selection 31 comprises two slides 32 which can slide along two guides 33 and 34 orthogonal to each other.

Thus, the body 35 of the means of selection, provided with an orifice 36 capable of receiving the elastic means 11 (not shown) is able to coincide (by movement in the direction of the arrows F and G) with one of the outlet orifices of the storage devices.

As a variant, and as shown in the detail D of FIG. 4, the fitting of the storage device 20 into the elastic means 11 is facilitated by providing notches 40, arranged at the end of each of these elements. These notches constitute a rapid means of connection between the various elements to be connected and advantageously enable the various internal bores to be centered, so as to create a continuous conduit for the parts 14 without any surface discontinuities.

The present invention is of course not limited to the embodiments described above and encompasses any variant available to a person skilled in the art. More particularly, such devices for distributing or storing parts may be used for parts other than rivets, for example screws, nails, staples etc.

What is claimed is:

1. A device for distributing parts singly, more particularly rivets (14), wherein it comprises:

a deformable elastic means (11) having a substantially tubular shape in the passive state comprising a central bore (12) with a narrow section and inlet (16) and outlet (15) orifices, said elastic means (11) being capable, in the active state, of expanding radially so as to receive and guide a part (14) in its central bore, and means for subjecting the central bore (12) of the elastic means to an excess pressure to bring about a radial expansion thereof so as to move, one by one, each part (14) placed at the inlet orifice (16) towards the outlet orifice (15) of the elastic means (11).

2. The distribution device as claimed in claim 1, wherein the elastic means (11) is a flat extensible sheath, in the passive state.

3. The distribution device as claimed in claim 1, wherein the elastic means (11) is placed inside a tubular element (17) having a longitudinal bore (19).

4. The distribution device as claimed in claim 3, wherein radial expansion of the elastic means (11) is limited in the active state by the tubular element (17).

5. The distribution device as claimed in claim 4, wherein the inlet orifice (16) of the elastic means (11) is fixed to the tubular element (17) at one end (18) of the latter.

6. The distribution device as claimed in claim 5, wherein attachment of the elastic means (11) to the tubular element (17) is achieved by turning over and gluing the elastic means (11) to the end (18) of the tubular element (17).

7. The distribution device as claimed in claim 1, wherein it comprises, in addition, a storage device (20) capable of containing a plurality of parts ($14_1, \ldots 14_n$) and capable of delivering them to order singly, to the inlet orifice (16) of the elastic means (11).

8. The distribution device as claimed in claim 7, wherein the storage device (20) comprises a tubular element (22), a connector (22a) and a retaining element (22b), each having a central bore (23) capable of housing said plurality of parts ($14_1, \ldots 14_n$) placed behind each other, said storage device (20) comprising, in addition, a retaining means (24) capable of retaining a first part ($14_1$) of the plurality and of freeing it to order.

9. The distribution device as claimed in claim 8, wherein the retaining means (24) consists of a first (25) and a second (26) ram projecting alternately inside the central bore, at the location of the first part ($14_1$) and of the second part ($14_2$) respectively.

10. The distribution device as claimed in claim 7, wherein the first part is subjected inside the storage device (20) to a pressure capable of delivering this part to the elastic means (11) when the first ram retracts.

11. The distribution device as claimed in claim 7, wherein the retaining means (24) comprises a means for controlling the first and second rams (25, 26).

12. The distribution device as claimed in claim 11, wherein the means for controlling the first and second rams is a valve.

13. The distribution device as claimed in claim 9, wherein the first and second rams are arranged orthogonally in relation to each other.

14. The distribution device as claimed in claim 1, wherein it comprises a plurality of storage devices (20) associated with a means of selection (31) capable of transfering a first part ($14_1$) waiting in one of the storage devices (20) to the inlet orifice (16) of the elastic means (11).

15. The distribution device as claimed in claim 14, wherein it comprises four storage devices (20).

16. The distribution device as claimed in claim 15, wherein the means of selection (31) is a plate (35) provided with an orifice (16) which can move in two orthogonal directions (F, G), said plate being able to bring said orifice (16) to coincide with the outlet orifice of each storage device.

17. The distribution device as claimed in claim 1, wherein it comprises a means of rapid connection (40) between the various tubular elements (22, 11) of which it consists.

18. The distribution device as claimed in claim 17, wherein the means of rapid connection is a plurality of notches (40) provided at each end of the connecting elements (22, 17) with a view to fitting them together to create a central bore without internal discontinuities.

19. A storage device capable of being used in the distribution device as claims in claim 1, wherein the said storage device comprises:

a tubular element (22), a connector (22a) and a retaining element (22b), each having a central bore (23) capable of housing and guiding a plurality of parts ($14_1, \ldots 14_n$) placed one behind the other, means for exerting a pressure inside said central bore (23), on a first part ($14_1$) of said plurality, and retaining means (24) provided in the retaining element (22b), capable firstly of retaining the first part ($14_1$) and the following part ($14_2$), secondly to free the first part ($14_1$) to order and thirdly to put the following part ($14_2$) in readiness by causing it to pass into the first position and thus to deliver each part of the plurality singly.

20. The storage device as claimed in claim 19, wherein the retaining means (24) consists of a first and second ram (25, 26) capable of projecting inside the central bore (23) at the location of the first part ($14_1$) and the second part ($14_2$) respectively.

21. The device as claimed in claim 19, wherein the retaining means (24) comprises a means for controlling the first and second rams.

22. The device as claimed in claim 21, wherein the means of control is a valve.

23. The device as claimed in claim 20, wherein the first and second rams (25, 26) are arranged orthogonally in relation to each other.

* * * * *

UNITED STATES PATENT AND TRADEMARK OFFICE
CERTIFICATE OF CORRECTION

PATENT NO. : 6,260,734 B1
DATED : July 17, 2001
INVENTOR(S) : Jean-Marc Auriol et al.

It is certified that error appears in the above-identified patent and that said Letters Patent is hereby corrected as shown below:

<u>Title page,</u>
Amend Item [73] to read as follows:
-- [73] Assignees: Ste. Ateliers de la Haute-Garonne-Ets Auriol Et Cie, Balma; Dassault Aviation, Vaucresson, both of (FR) --.

Signed and Sealed this

Fourteenth Day of May, 2002

*Attest:*

*Attesting Officer*

JAMES E. ROGAN
*Director of the United States Patent and Trademark Office*